United States Patent [19]
Kato

[11] 3,913,840

[45] Oct. 21, 1975

[54] HEADLIGHT CLEANER FOR VEHICLES

[75] Inventor: Mikio Kato, La Vale, Md.

[73] Assignee: Lawrence Peska Associates, Inc., New York, N.Y. ; a part interest

[22] Filed: June 26, 1974

[21] Appl. No.: 483,101

[52] U.S. Cl............... 239/284; 134/199; 240/7.1 R
[51] Int. Cl.² ........................ B05B 1/10; B60S 1/46
[58] Field of Search.................. 239/284; 134/199; 240/7.1 R

[56] References Cited
UNITED STATES PATENTS

| | | | |
|---|---|---|---|
| 3,117,727 | 1/1964 | Pollock et al. | 239/284 |
| 3,423,025 | 1/1969 | Rodger | 239/284 |
| 3,574,337 | 4/1971 | Edwards et al. | 239/284 |
| 3,593,015 | 7/1971 | Marchant | 239/284 |
| 3,609,450 | 9/1971 | Hart | 240/7.1 R |
| 3,719,819 | 3/1973 | Lowell | 239/284 |

*Primary Examiner*—Lloyd L. King
*Attorney, Agent, or Firm*—Richard E. Nanfeldt

[57] ABSTRACT

A headlight cleaning device for vehicles such as automobiles, tanks, and aircraft so that the operator is assured of optimum light transmission and illumination of the vehicle. This includes reservoir tank means for containing a fluid for cleaning and spray nozzles aimed directly onto the lens of each headlight to clean them off, the nozzles being adjustable to give an initial sharp spray to dislodge the dirt, and a later if desired, cleaning spray to sluice off the dirt so that the lenses are cleaned off. Automatic light sensing means are provided to sense the light output of the lens and to turn on the cleaning spray when the light output falls below the predetermined level of lumens.

6 Claims, 3 Drawing Figures

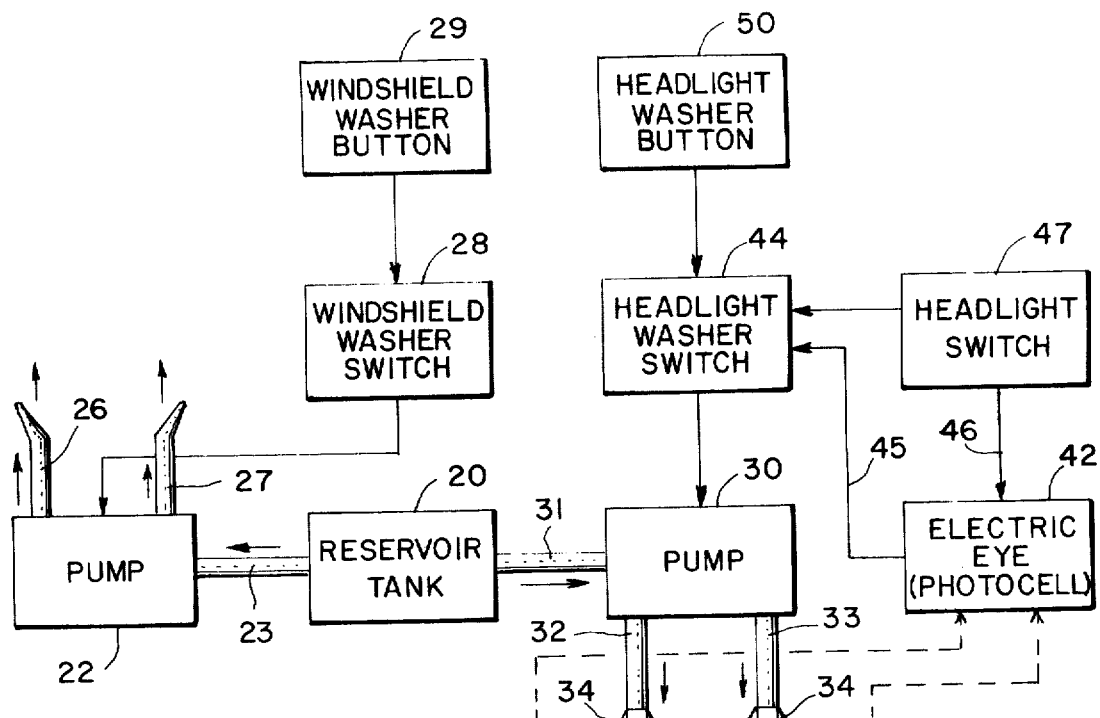
Fig. 1
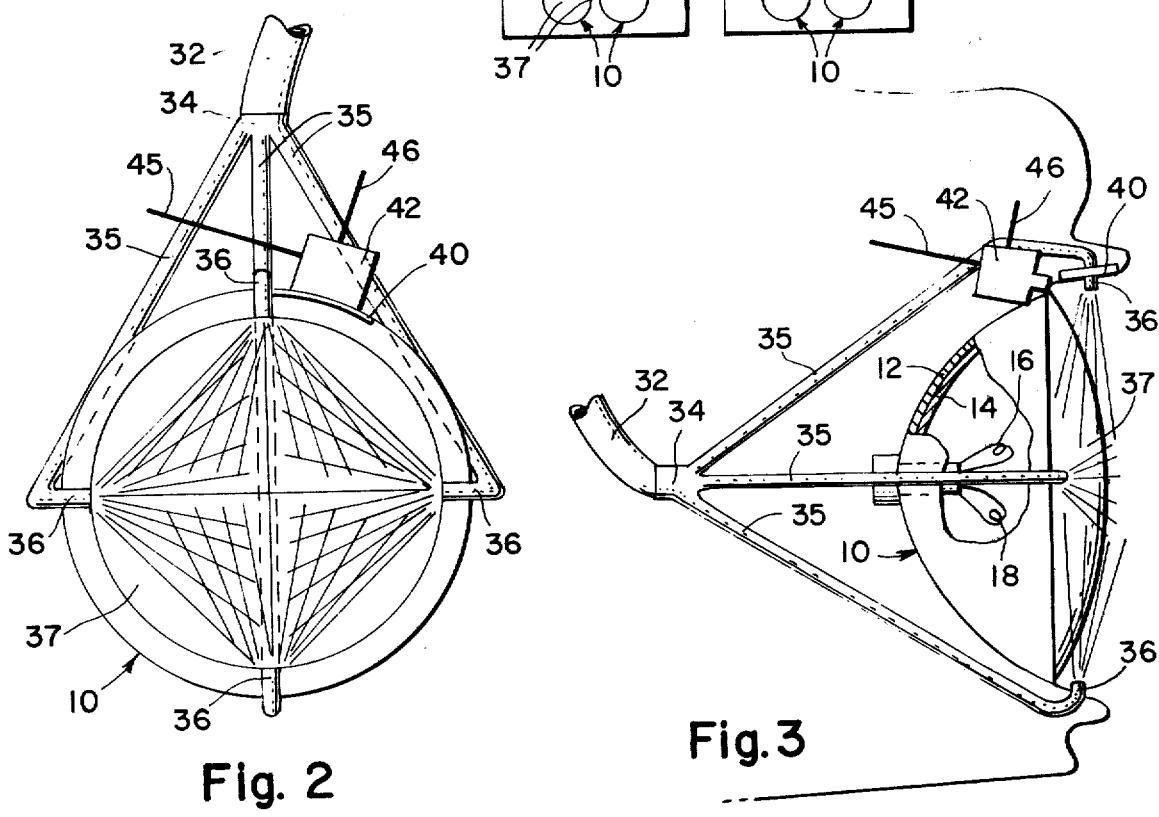
Fig. 2
Fig. 3

HEADLIGHT CLEANER FOR VEHICLES

This invention relates to improvements in cleaning devices for vehicle lights and the like.

An object of the invention is to provide a novel and improved cleaning device for the lights of vehicles, such as automobiles, trucks, tanks, aircraft and motorcycles.

Another object of the invention is to provide a novel and improved cleaning device for the lights of vehicles, which can be operated from inside the vehicle, to cast light even in severe storm, and snow conditions.

A further object of the invention is to provide a novel and improved cleaning device for the lights of vehicles, in which there is a reservoir containing a cleaning fluid, and spraying means for spraying the fluid onto the window or light pane, to clean off dust, dirt, debris and the like so that the light from the lamp filament or other source can penetrate through and out into the open.

Still another object of the invention is to provide a novel and improved device which is not only self illuminating, but also self cleansing, so that the light generated thereby is not dissipated by contamination of dust and dirt on its light emitting surface.

Still a further object of the invention is to provide a novel and improved device for emitting light and for cleaning said device, which is simple in design, can be installed on motor and other vehicles at low cost, and can be made by either hand or machine tools by relatively unskilled labor, and which can contribute to the ultimate safety of vehicles not only on the highways, but also on farm roads and mountain access roads where frequently lack of ambient illumination, for tour parties is dangerous.

The above and other objects and advantages of the invention will become apparent from the following description of a preferred embodiment thereof, as illustrated in the accompanying drawings, forming a part hereof.

In the drawings:

FIG. 1 is a schematic and box circuit diagram of the elements and circuitry connections of the device.

FIG. 2 is a front elevational view of a headlight according to the invention.

FIG. 3 is a side elevational view of the headlight of FIG. 2.

In connection with the extensive use of motor vehicles, many accidents have been apparently caused by insufficient illumination of the highways or back country roads, especially where the headlights are coated with dust, dirt, road salting residues and the like which prevents the lamp filaments from projecting a good lighting pattern not only ahead on the roadway, but also along the shoulders of the road. Driving in the night time hours with dim lights caused by such dirt, smudges and insects could be extremely dangerous.

Yet there has been no way to safely stop the car on the shoulder of the road and clean the headlights with paper towels, if available, and dangerous, leaving the driver with the alternative of merely just taking a chance, and continuing to drive with dimly lighted headlights. While windshield wipers are known and in use, the present invention seeks to provide a headlight lamp washing device to keep the headlights at full light intensity as needed.

This is accomplished by providing a reservoir tank containing a suitable cleaning fluid, such as plain water, or a mixture of detergents or soaps which can clean off a window glass of a headlight by being sprayed thereon. A pump sprays the liquid through nozzles, and electric eye or photocell means are used to sense the diminution of light passage due to dirt coating on the headlight, and to turn on the spraying cleaning apparatus.

In order to understand clearly the nature of the invention, and the best means for carrying it out, reference may be had to the drawings, in which like numerals denote similar parts throughout the several views.

As shown, there are motor vehicle headlights 10 which may be mounted in suitable housings on vehicles, such as automobiles, aircraft, combat tanks or the like for lighting up the paths of movement of such vehicles. In earlier days, such headlights were made with small sized light bulbs with silver coated reflectors and cast their light through glass headlight lenses onto the exterior road. Later, sealed beam headlights were introduced, in which the entire lamp was self contained, in a glass housing, vacuum exhausted, with a filament or two for low and high beams, and with a reflective backing coating on the rear surface of the casing so that a good deal of the light was projected through the lens onto the exterior or road.

Thus the rear glass wall 12 has a reflective metallic coating 14 sputtered thereon for high reflectivity in the vacuum process to collect and guide the high or low beam filaments 16 and 18 onto the exterior roadway as needed. A reservoir tank 20 is mounted under the car hood or other portion, for containing a quantity of cleaning liquid, and there is a first pump 22 for pumping cleaning liquid through tube 23 onto the left and right sides of the car windshield by delivery tubes 26 and 27, with the aid of a windshield washer switch 28 activated by a windshield washer button 29.

There is also another liquid pump 30 coupled by duct 31 to the reservoir tank 20 for pumping cleaning fluid through delivery tubes 32 and 33 to distribution header 34 which is mounted behind each headlight, and has spray delivery tubings 35 extending outwardly angularly therefrom to the front ends of the headlights 10, and connected at their outer ends with spray nozzles 36 aimed directly onto the headlight lenses 37 from four angles of impact. The nozzles 36 may be made adjustable to give a spray at any desired angle onto the lens, and also as to the type of spray, such as a needle spray for fine sharp impact, or a soft spray for rinsing thereafter to flush off the dirt loosened by the sharp spray.

For automatic operation, there is a reflexing mirror 40 situated above the headlight cover which casts the light to the electric eye 42 which includes a light sensitive photocell which responds to the dimming of headlights caused by the smudges and which turns the switch 44 by wires 45 and 46 to turn on the pump 30, the headlight switch 47 being connected in the usual lighting circuit of the car. For manual operation, there is the headlight washer button 50 to routinely clean off the headlights, and thus there is a combination of manual and automatic cleaning means to assure good lighting.

The electric eye becomes operational as the headlights are turned on by the driver. Thus it is seen that the invention seeks to provide a solution to this road lighting problem in order to lessen the dangers on the highway for users of vehicles.

As the invention has been described in specific terms, it is understood that various changes may be made in size, shape, materials and arrangement without departing from the spirit and scope of the invention as claimed.

Having herein described the invention, what is claimed as new is:

1. A headlight cleaner for a motor vehicle, which comprises:
   a. a reservoir tank adapted to be received within a motor vehicle having a plurality of sealed beam headlights therein, said reservoir tank adapted to receive a cleaning solution therein;
   b. a pump adapted to be received in said motor vehicle;
   c. a duct joining said pump to said reservoir tank in a fluid serial connection;
   d. a distribution header mounted behind each said headlight;
   e. a plurality of delivery tubes joining said pump to each said distribution header;
   f. a plurality of spray delivery tubes extending outwardly angularly from each said distribution header to a front end of each said headlight; and
   g. a spray nozzle joined to an outer end of each said delivery tube, said spray nozzles aimed directly onto the lenses of each said headlight from the outer peripheries of each said lense towards a center of each said lense.

2. A headlight cleaner according to claim 1, wherein there are four said spray nozzles positioned equidistant around said periphery of each said lense.

3. A headlight cleaner according to claim 1, wherein each said spray nozzle is adjustable.

4. A headlight cleaner according to claim 1, wherein said pump is activated by headlight washer button mounted in an interior of said motor vehicle.

5. A headlight cleaner according to claim 1, further comprising a means for automatically activating said pump upon a decrease in the light lumens output from said headlight.

6. A headlight cleaner according to claim 5, wherein said means for automatically activating said pump comprises:
   a. an electrically switch joined to said pump said switch wired into a circuity of said motor vehicle;
   b. an electric cell having a photo-electric eye therein, said cell wired to said switch; and
   c. a reflexing mirror adapted to be mounted onto said motor vehicle, said mirror reflecting said lumen output from said headlight to said electric eye, said pump activated when said light lumen output decrease below a predetermined level of ambient illumination.

* * * * *